(12) United States Patent
Nekozuka

(10) Patent No.: US 8,933,846 B2
(45) Date of Patent: Jan. 13, 2015

(54) PORTABLE ELECTRONIC DEVICE

(75) Inventor: Hikaru Nekozuka, Yokohama (JP)

(73) Assignee: KYOCERA Corporation, Kyoto (JP)

(*) Notice: Subject to any disclaimer, the term of this patent is extended or adjusted under 35 U.S.C. 154(b) by 681 days.

(21) Appl. No.: 13/131,534

(22) PCT Filed: Nov. 26, 2009

(86) PCT No.: PCT/JP2009/006395
§ 371 (c)(1),
(2), (4) Date: Jul. 25, 2011

(87) PCT Pub. No.: WO2010/061609
PCT Pub. Date: Jun. 3, 2010

(65) Prior Publication Data
US 2011/0267238 A1 Nov. 3, 2011

(30) Foreign Application Priority Data
Nov. 26, 2008 (JP) ................................. 2008-301184

(51) Int. Cl.
*H01Q 1/24* (2006.01)
*H01Q 7/00* (2006.01)
*H04M 1/02* (2006.01)

(52) U.S. Cl.
CPC ................ *H01Q 1/243* (2013.01); *H01Q 7/00* (2013.01); *H04M 1/0247* (2013.01); *H04M 1/0214* (2013.01); *H04M 1/0225* (2013.01); *H04M 1/0235* (2013.01)
USPC ...................... 343/702; 343/700 MS; 343/878

(58) Field of Classification Search
CPC ........... G08B 13/2471; G06K 19/0723; H04B 5/0031; H01Q 1/243; H01Q 1/245; H01Q 1/526
USPC .................... 343/702, 700 MS, 878
See application file for complete search history.

(56) References Cited

U.S. PATENT DOCUMENTS

2003/0137459 A1* 7/2003 Kim et al. ...................... 343/702
2006/0125700 A1* 6/2006 Kanazawa ..................... 343/702

(Continued)

FOREIGN PATENT DOCUMENTS

JP 2002-314313 A 10/2002
JP 2004-310551 A 11/2004

(Continued)

OTHER PUBLICATIONS

International Search Report for PCT/JP2009/006395, mailed Feb. 16, 2010.

*Primary Examiner* — Allyson Trail
(74) *Attorney, Agent, or Firm* — Hoffmann & Baron, LLP

(57) ABSTRACT

A portable electronic device is capable of transforming into first and second states, and is equipped with an antenna disposed such that in the first state the antenna is near a magnetic field-shielding part and communication is not possible and in the second state the antenna is separated from the magnetic field-shielding part and communication is possible. This portable electronic device is equipped with: an operation-unit-side chassis; a display-unit-side chassis; a connecting part that connects the operation-unit-side chassis and the display-unit-side chassis such that transformation to the first state and to the second state are possible; a magnetic field-shielding part disposed in the operation-unit-side chassis; and an antenna that is disposed in the display-unit-side chassis.

8 Claims, 12 Drawing Sheets

(56) References Cited

U.S. PATENT DOCUMENTS

| | | | |
|---|---|---|---|
| 2006/0187061 A1* | 8/2006 | Colby | 340/572.8 |
| 2007/0090954 A1* | 4/2007 | Mahaffey | 340/572.3 |
| 2008/0000987 A1* | 1/2008 | Augustinowicz et al. | 235/492 |
| 2008/0128514 A1* | 6/2008 | Sabbah et al. | 235/492 |
| 2009/0085819 A1* | 4/2009 | Watanabe | 343/787 |
| 2009/0111531 A1* | 4/2009 | Cui et al. | 455/572 |
| 2010/0052997 A1* | 3/2010 | Kan et al. | 343/702 |
| 2010/0110655 A1* | 5/2010 | Tokuyama | 361/816 |
| 2010/0263179 A1* | 10/2010 | Boldin | 28/100 |
| 2014/0060722 A1* | 3/2014 | Finn | 156/73.1 |

FOREIGN PATENT DOCUMENTS

| | | |
|---|---|---|
| JP | 2005-341027 A | 12/2005 |
| JP | 2006-42142 A | 2/2006 |
| JP | 2006-166265 A | 6/2006 |
| JP | 2007-6029 A | 1/2007 |
| JP | 2007-336480 A | 12/2007 |
| JP | 2008-104007 A | 5/2008 |
| JP | 2008-136224 A | 6/2008 |
| JP | 2008-166991 A | 7/2008 |
| JP | 2008-182417 A | 8/2008 |
| WO | WO 2007/015406 A1 | 2/2007 |

* cited by examiner ular telephone device.

PORTABLE ELECTRONIC DEVICE

CROSS-REFERENCE TO RELATED APPLICATIONS:

This application is the National Stage of International Application No. PCT/JP2009/006395, filed Nov. 26, 2009, which claims the benefit of Japanese Application No. 2008-301184, filed Nov. 26, 2008, the entire contents of all of which are incorporated by reference herein.

FIELD OF THE INVENTION

The present invention relates to a portable electronic device such as a cellular telephone device.

BACKGROUND OF THE INVENTION

In recent years, some cellular telephone devices as portable electronic devices include a function similar to a contactless IC card.

For example, there has been proposed a cellular telephone device including a loop antenna, in which information is read and written by inductive coupling of an external device and the loop antenna (for example, see Patent Document 1).

Patent Document 1: Japanese Unexamined Patent Application, Publication No. 2007-336480

SUMMARY OF THE INVENTION

Problems to be Solved by the Invention

The present invention provides a portable electronic device including a loop antenna, in which information is read and written by inductive coupling of an external device and the loop antenna, bodies in relative positions are transformable into a first state and a second state, and each state is associated with using or not using the loop antenna.

Means for Solving the Problems

The present invention relates to a portable electronic device, including: a first body; a second body; a connecting portion that connects the first body and the second body so as to be transformable into a first state and a second state; a magnetic field shielding portion that is disposed in the first body; and an antenna that is disposed in the second body, disposed in an adjacent position that is adjacent to the magnetic field shielding portion in the first state, and is disposed in a separated position that is more separated from the magnetic field shielding portion than the adjacent position in the second state.

The present invention relates to a portable electronic device, including: a first body including a first face; a second body including a second face and a third face; a connecting portion that connects the first body and the second body so as to be transformable into a first closed state in which the first face and the second face are disposed to be superimposed in a state of being adjacent to each other, and a second closed state in which the first face and the third face are disposed to be superimposed in a state of being adjacent to each other; and a magnetic field shielding portion that is disposed in the first body; and an antenna that is disposed so as to be closer to a side of the first face of the second body.

The present invention relates to a portable electronic device, including: a first body including a first face; a second body that is disposed so as to be superimposed on a side of the first face of the first body; a connecting portion that connects the first body and the second body so as to be relatively and slidably moved and to be transformable into an opened state in which a predetermined area of the first face is externally exposed, and a closed state in which the predetermined area is covered; a magnetic field shielding portion that is disposed in the first body; and an antenna that is disposed in the second body, disposed in an adjacent position that is adjacent to the magnetic field shielding portion in one of the opened state or the closed state, and is disposed in a separated position that is more separated from the magnetic field shielding portion than the adjacent position in another one of the opened state or the closed state.

The present invention relates to a portable electronic device, including: a first body including a first face; a second body that is disposed so as to be superimposed on a side of the first face of the first body; a connecting portion that includes a rotational axis extending in a direction intersecting the first face of the first body, and connects the first body and the second body so as to be relatively rotatable around the rotational axis and transformable into a first state and a second state; a magnetic field shielding portion that is disposed in the first body; and an antenna that is disposed in the second body, disposed in an adjacent position that is adjacent to the magnetic field shielding portion in one of the first state or the second state, and is disposed in a separated position that is more separated from the magnetic field shielding portion than the adjacent position in another one of the first state or the second state.

Effects of the Invention

According to the present invention, it is possible to provide a portable electronic device that is transformable into a first state and a second state, and includes an antenna that is disposed so as to be not capable of communicating by being adjacent to a magnetic field shielding portion in the first state, and to be capable of communicating by being separated from the magnetic field shielding portion in the second state.

Figure 1:
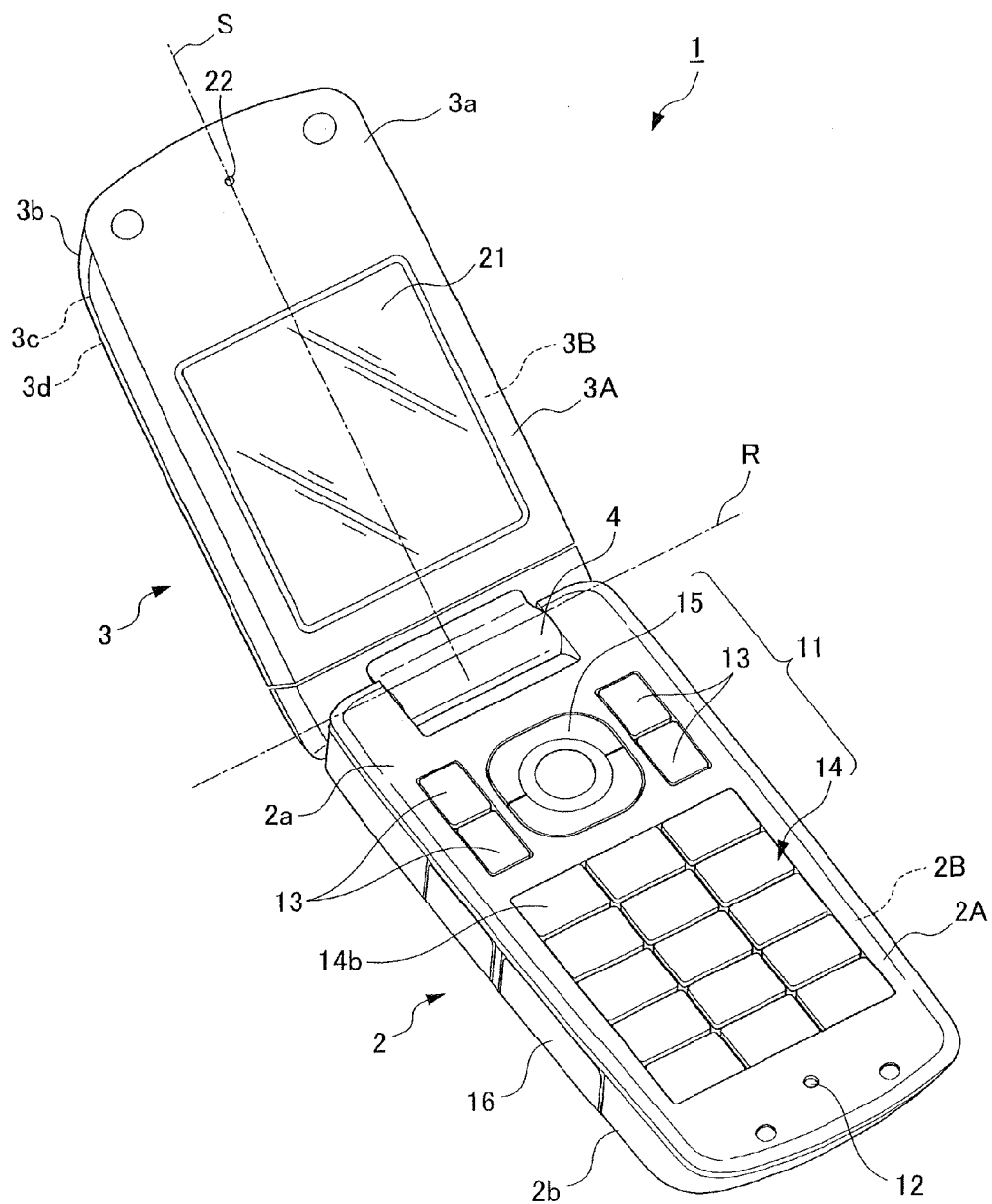
FIG. 1 shows a perspective view showing an appearance of a cellular telephone device 1 in an opened state.

EXPLANATION OF REFERENCE NUMERALS 1 cellular telephone device
2 operation unit side body
2A operation unit side inner face
3 display unit side body
3A display unit side inner face
4 connecting portion
100 loop antenna
102 sheet portion
104 coil portion
160 magnetic sheet
170 magnetic field shielding portion
S opening-and-closing axis
R rotational axis
Z rotational axis

DETAILED DESCRIPTION OF THE INVENTION

A preferred embodiment for carrying out the present invention is hereinafter described with reference to the drawings.

First, a basic structure of a cellular telephone device 1 is described with reference to FIG. 1. FIG. 1 shows a perspective view showing an appearance of the cellular telephone device 1 in an opened state.

As shown in FIG. 1, the cellular telephone device 1 as a portable electronic device includes: an operation unit side body 2 as a first body; and a display unit side body 3 as a second body. The operation unit side body 2 includes: an operation unit side inner face 2A as a first face; and an operation unit side outer face 2B that is opposite to the operation unit side inner face 2A. The display unit side body 3 includes: a display unit side inner face 3A as a second face; and a display unit side outer face 3B as a third face that is opposite to the display unit side inner face 3A.

The operation unit side body 2 and the display unit side body 3 are connected via a connecting portion 4 including a hinge mechanism. More specifically, an upper end portion of the operation unit side body 2 and a lower end portion of the display unit side body 3 are connected via the connecting portion 4.

The connecting portion 4 includes a so-called 2-axis hinge mechanism. The connecting portion 4 connects the operation unit side body 2 and the display unit side body 3 so as to be openable and closable, and can reverse the front and back of the display unit side body 3 with regard to the operation unit side body 2.

The connecting portion 4 connects the operation unit side body 2 and the display unit side body 3 so as to be openable and closable around the opening-and-closing axis R, such that the operation unit side body 2 and the display unit side body 3 are transformable into: an opened state in which the display unit side body 3 is disposed in an opened position as a first relative position with regard to the operation unit side body 2, and the operation unit side inner face 2A and display unit side inner face 3A are disposed so as to be separated from each other; and a closed state in which the display unit side body 3 is disposed in a closed position as a second relative position with regard to the operation unit side body 2, and the operation unit side inner face 2A and display unit side inner face 3A are disposed so as to be superimposed in a state of being adjacent to each other.

In the opened state, the connecting portion 4 connects the operation unit side body 2 and the display unit side body 3 such that the display unit side body 3 is rotatable around a rotational axis S, which intersects an opening-and-closing axis R, with regard to the operation unit side body 2.

The connecting portion 4 connects the operation unit side body 2 and the display unit side body 3 so as to be transformable into: a first closed state in which the display unit side body 3 is superimposed on the operation unit side body 2 in a state in which the operation unit side inner face 2A and the display unit side inner face 3A are adjacent to each other; and a second closed state in which the display unit side body 3 is superimposed on the operation unit side body 2 in a state in which the operation unit side inner face 2A and the display unit side outer face 3B are adjacent to each other.

As a result, the cellular telephone device 1 is configured such that the operation unit side body 2 and the display unit side body 3 connected via the connecting portion 4 can be relatively moved.

The cellular telephone device 1 can be transformed into: an opened state in which the operation unit side body 2 and the display unit side body 3 are separated from each other; and another opened state in which the operation unit side body 2 and the display unit side body 3 are folded and superimposed with each other.

Moreover, the cellular telephone device 1 in the opened state is transformable to switch the front and back of the display unit side body 3. The cellular telephone device 1 in the opened state is transformable into: a first opened state in which the operation unit side inner face 2A and the display unit side inner face 3A are oriented to the same side; and a second opened state in which the operation unit side inner face 2A and the display unit side inner face 3A are oriented to different sides (for example, opposite sides).

Moreover, the cellular telephone device 1 in the closed state is transformable into: the first closed state in which the operation unit side inner face 2A and the display unit side inner face 3A are disposed so as to be superimposed with each other in a state of being adjacent to each other; and the second closed state in which the operation unit side inner face 2A and the display unit side outer face 3B are disposed so as to be superimposed with each other in a state of being adjacent to each other.

An outer face of the operation unit side body 2 is configured with a front case 2a and a rear case 2b. The operation unit side body 2 is configured to expose, on the front case 2a side (the operation unit side inner face 2A side), an operation key set 11 and a microphone 12 as a microphone to which sound produced by a user of the cellular telephone device 1 during a phone call is input.

The operation key set 11 is configured with: function setting operation keys 13 for operating various functions such as for various settings, a telephone number directory function and a mail function; input operation keys 14 for inputting the digits of a telephone number, characters for mail, and the like; and a selection operation key 15 for performing selection of the various operations, scrolling up, down, left and right, etc. Predetermined functions are assigned (key assignment) to each key configuring the operation key set 11 in accordance with the opened/closed state of the operation unit side body 2 and the display unit side body 3, various modes, and the type of application that is running. An operation corresponding to a function assigned to each key is executed by the user depressing each key.

Here, the set of input operation key members 14b, which configure the input operation keys 14 and are disposed in a lower portion (in FIG. 1) of the operation unit side body 2, are made of metal. This set of input operation key members 14b configures a magnetic field shielding portion 170 to be described later.

The microphone 12 is disposed to an outer end side that is opposite to the connecting portion 4 side in a longitudinal direction of the operation unit side body 2. In other words, the microphone 12 is disposed to one outer end side of the cellular telephone device 1 in the opened state.

An interface (not illustrated) for communicating with an external device (for example, a host device) is disposed on one side face of the operation unit side body 2. Side keys, to which predetermined functions are assigned, and an interface (not illustrated) where external memory is inserted and removed are disposed on another side face of the operation unit side body 2. Each interface is covered with a cap. When not in use, each interface is covered with a cap.

An outer face of the display unit side body 3 is configured with a front panel 3a, a front case 3b, a rear case 3c, and a rear panel 3d. In the display unit side body 3, a display unit 21 for displaying a variety of information on the display unit side inner face 3A, and a speaker 22 as a receiver for outputting sound of the other party of a phone call are disposed so as to be exposed to the outside.

The display unit 21 is configured with a liquid crystal display panel, a drive circuit that drives the liquid crystal display panel, and a light source unit such as a backlight that irradiates light from the back face side of the liquid crystal display panel.

Here, a loop antenna 100 (to be described later) is disposed inside a portion corresponding to an upper portion (in FIG. 1) of the display unit 21 of the operation unit side body 2.

Next, internal structures of the operation unit side body 2 and the display unit side body 3 are described with reference to FIGS. 2 to 7.

Figure 2:
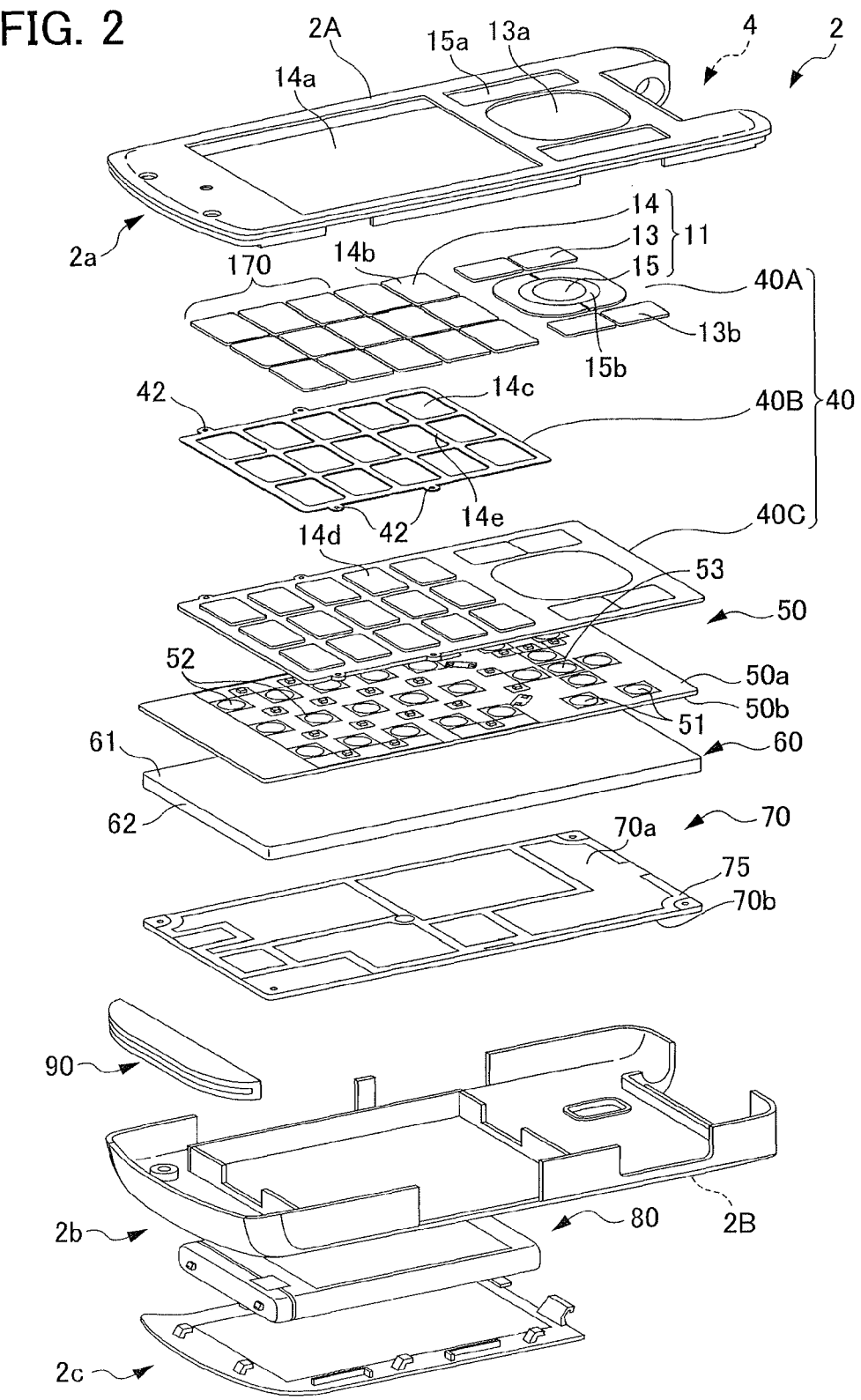
FIG. 2 is an exploded perspective view of members built into an operation unit side body 2.
Figure 3:
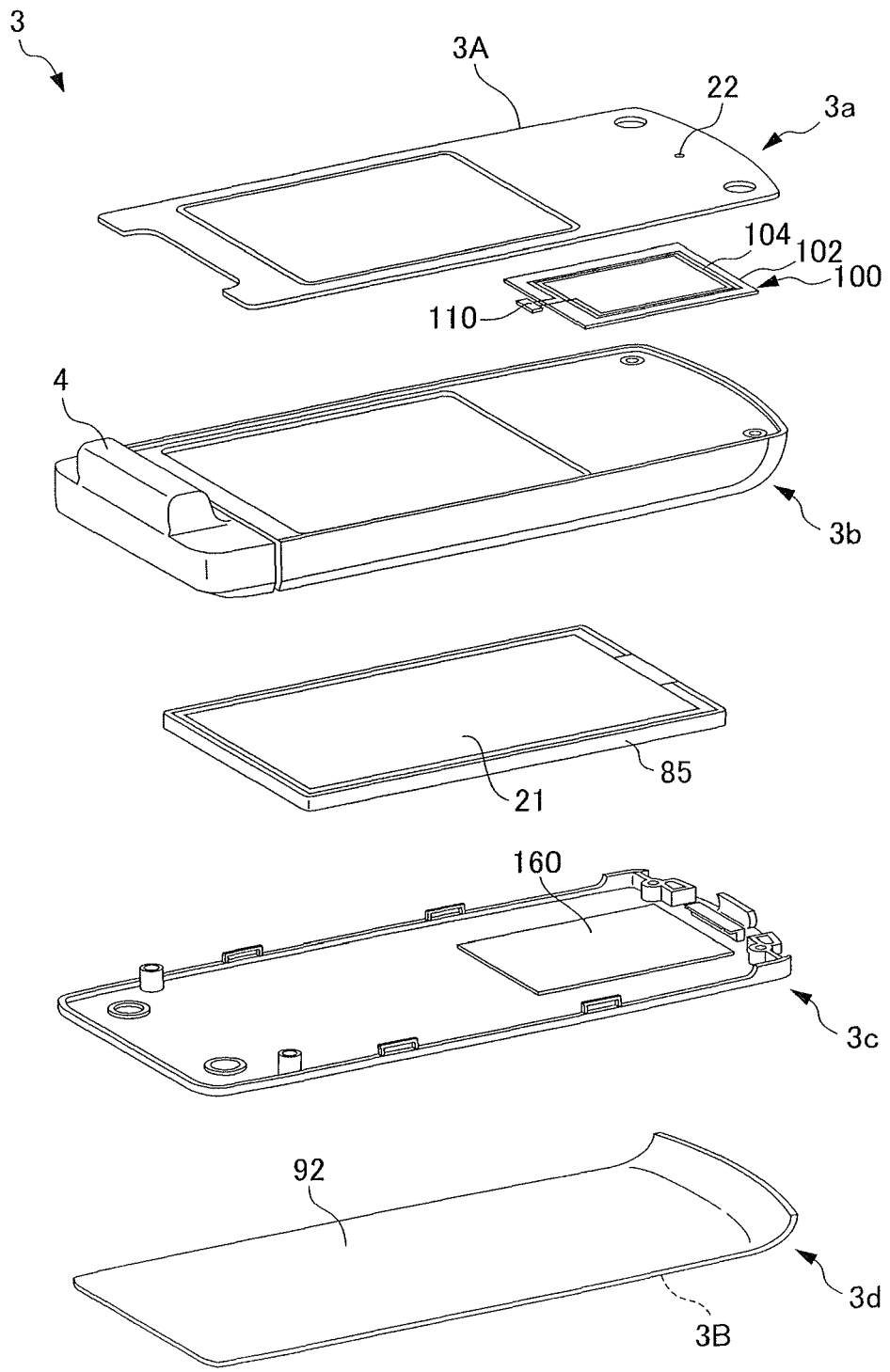
FIG. 3 is an exploded perspective view of members built into a display unit side body 3.
Figure 4:
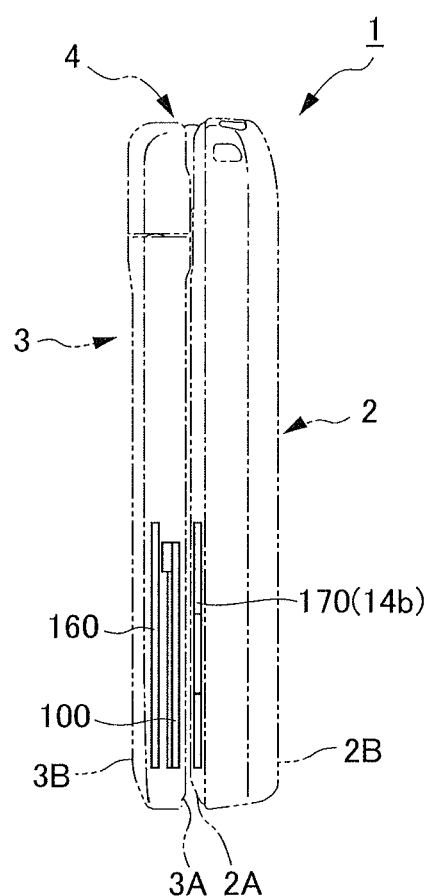
FIG. 4 is a diagram illustrating an arrangement of a loop antenna 100 in a first closed state.
Figure 5:
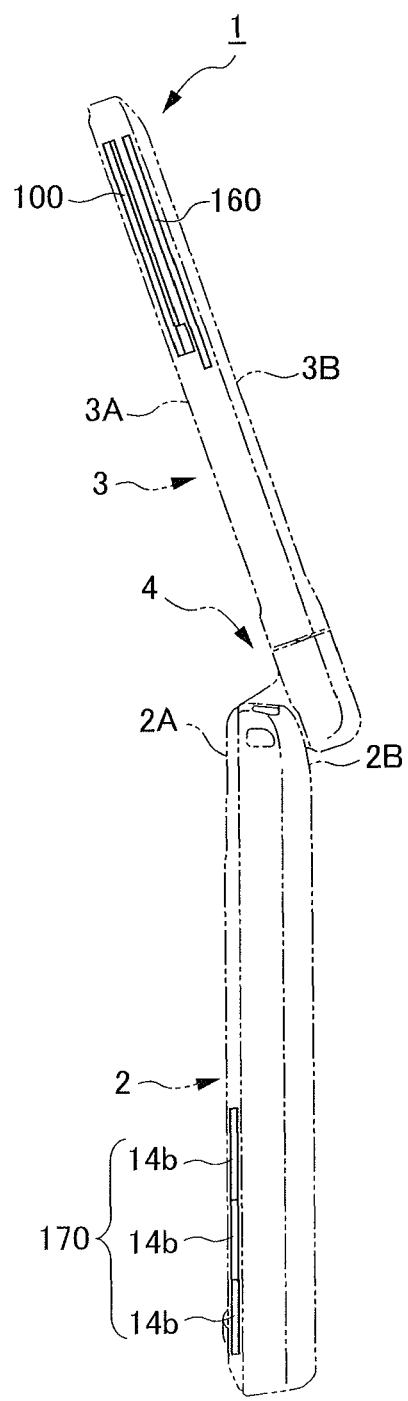
FIG. 5 is a diagram illustrating an arrangement of the loop antenna 100 in a first opened state.
Figure 6:
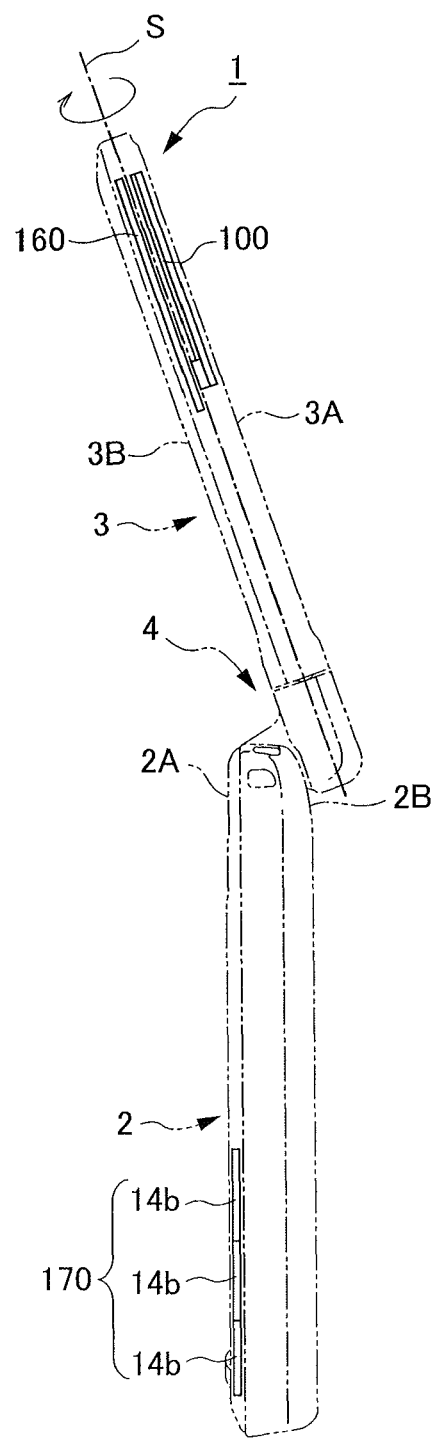
FIG. 6 is a diagram illustrating an arrangement of the loop antenna 100 in a second opened state.
Figure 7:
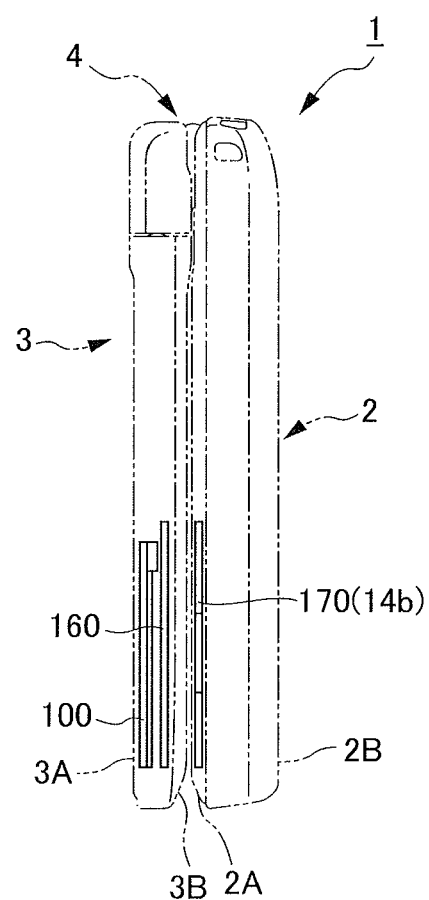
FIG. 7 is a diagram illustrating an arrangement of the loop antenna 100 in a second closed state.

FIG. 2 is an exploded perspective view of members built into the operation unit side body 2. FIG. 3 is an exploded perspective view of members built into the display unit side body 3. FIG. 4 is a diagram illustrating an arrangement of the loop antenna 100 in the first closed state. FIG. 5 is a diagram illustrating an arrangement of the loop antenna 100 in the first opened state. FIG. 6 is a diagram illustrating an arrangement of the loop antenna 100 in the second opened state. FIG. 7 is a diagram illustrating an arrangement of the loop antenna 100 in the second closed state.

As shown in FIG. 2, the operation unit side body 2 includes: the front case 2a; a key structure unit 40; a key substrate 50; a case body 60; a circuit board 70 including various electronic components such as a reference potential patterned layer 75 and an RF (Radio Frequency) module for a cellular telephone device; a main antenna unit 90 for radio communication via an external base station; the loop antenna 100 that forms a loop in the opened state; the rear case 2b including a battery lid 2c; and a battery 80.

The front case 2a and the rear case 2b are disposed such that concave inner surfaces thereof face each other, and are connected such that peripheries thereof are superimposed with each other. Moreover, the key structure unit 40, the key substrate 50, the case body 60, the circuit board 70, the main antenna unit 90 and the loop antenna 100 are built therein so as to be interposed between the front case 2a and the rear case 2b.

Key holes 13a, 14a and 15a are formed in the inner face (the operation unit side inner face 2A) of the front case 2a, which faces the display unit 21 of the display unit side body 3 in the closed state in which the cellular telephone device 1 is folded. Each depression face of function setting operation key members 13b that configure the function setting operation keys 13, each depression face of input operation key members 14b that configure the input operation keys 14, and a depression face of a selection operation key member 15b that configures the selection operation key 15 are exposed from the key holes 13a, 14a and 15a, respectively. By pushing so as to depress each depression face of the function setting operation key members 13b, the input operation key members 14b, and the selection key member 15b, which are thus exposed, an apex of a metal dome (shaped like a bowl) (to be described later) provided in each of key switches 51, 52 and 53 is depressed, thereby contacting a switch terminal to establish electrical connection.

The key structure unit 40 is configured with operation members 40A, a key frame 40B as a reinforcing member, and a key sheet 40C as a sheet member.

The operation members 40A are configured with a plurality of key operation members. More specifically, the operation members 40A are configured with the function setting operation key members 13b, the input operation key members 14b and the selection operation key member 15b. Each operation key member that configures the operation members 40A is adhered to the key sheet 40C by interposing the key frame 40B (to be described later) therebetween. The depression faces of the operation key members adhered to the key sheet 40C are disposed so as to be exposed from the key holes 13a, 14a and 15a to the outside, respectively, as described above.

Here, the set of input operation key members 14b, which configure the input operation keys 14 and are disposed in a lower portion (in FIG. 1) of the operation unit side body 2, are made of metal. This set of input operation key members 14b configures the magnetic field shielding portion 170 that inhibits communication of the loop antenna 100 that is disposed adjacently thereto.

The magnetic field shielding portion 170 is configured with the set of input operation key members 14b that are disposed on an end portion side that is opposite to the connecting portion 4 side in the operation unit side body 2. The magnetic field shielding portion 170 is disposed on the operation unit side inner face 2A side of the operation unit side body 2. Here, the magnetic field shielding portion 170 may be configured by including the key frame 40B in addition to the set of input operation key members 14b.

The magnetic field shielding portion 170 is disposed adjacently to the display unit side body 3 in a case in which the cellular telephone device 1 is in the closed state. Here, in a case in which the loop antenna 100 is disposed so as to be closer to one face side of the display unit side body 3, the magnetic field shielding portion 170 is adjacent to the loop antenna 100 in one of the first closed state or the second closed state, and the magnetic field shielding portion 170 is separated from the loop antenna 100 in another one of the first closed state or the second closed state.

The key frame 40B is a metallic plate-like member with a plurality of holes 14c formed therein. The key frame 40B is a reinforcing member for preventing an adverse effect on the circuit board 70 and the like due to depression of the input operation key members 14b. Moreover, the key frame 40B is an electrically conductive member, and also functions as a member for dissipating static electricity of the input operation key members 14b. Convex portions 14d formed on the key sheet 40C (to be described later) are disposed to fit in the plurality of holes 14c formed in the key frame 40B. In addition, the input operation key members 14b are adhered to the convex portions 14d.

The key sheet 40C is a sheet member made of flexible silicon rubber. The plurality of convex portions 14d are formed on the key sheet 40C as described above. The plurality of convex portions 14d are formed on a side on which the key frame 40B is disposed on the key sheet 40C. The plurality of convex portions 14d are formed in positions corresponding to the key switches 52 (to be described later), respectively.

The key substrate 50 has the plurality of key switches 51, 52 and 53 disposed on a first face 50a that is a face on the key sheet 40C side. The plurality of key switches 51, 52 and 53 are disposed in positions corresponding to the operation members 40A, respectively. The key switches 51, 52 and 53 disposed on the key substrate 50 have a structure of a metal dome made of a metal plate that is three-dimensionally curved like a bowl. The metal dome is configured such that, when an apex of the bowl-shaped metal dome is depressed, contact is made with a switch terminal formed on an electric circuit (not illustrated) printed on the key substrate 50, thereby establishing an electrical connection. Moreover, a plurality of metal interconnections are formed on a second face 50b side of the key substrate 50.

As shown in FIG. 2, the case body 60 is an electrically conductive member having a shape in which one large face of a thin right-angled parallelepiped is opened. The case body 60 has a rib 62 that is formed substantially perpendicularly to a face of the opening side of a flat plate portion 61. The rib 62 is formed with a height as high as, or sufficiently higher than, the highest electronic component among the various electronic components mounted on the circuit board 70. The rib 62 is formed so as to correspond to the reference potential patterned layer 75 that configures a reference potential portion at the periphery and inside of the flat plate portion 61. More specifically, the rib 62 is formed so as to be disposed on the reference potential patterned layer 75 in a state where the case body 60 is placed on the circuit board 70. It should be noted that, instead of forming the case body 60 with metal, the case body 60 may be formed with a skeleton formed of resin, and a conductor film formed on a surface thereof.

By causing a bottom face of the rib to abut on the reference potential patterned layer 75, the case body 60 is electrically connected to the reference potential patterned layer 75. The case body 60 is electrically connected to the reference potential patterned layer 75, and thus has an electric potential that is as high as that of the reference potential patterned layer 75. In other words, the case body 60 functions as a shielding case. As a shielding case, the case body 60 suppresses influence of noise such as a high frequency wave from the outside on various electronic components disposed on the circuit board 70, and shields noise emitted from an RF (Radio Frequency) circuit, a CPU circuit, a power supply circuit and the like, thereby suppressing influence of such noise on other electronic components, a receiving circuit and the like connected to the main antenna unit 90. More specifically, the bottom face of the rib 62 in the case body 60 is disposed on the reference potential patterned layer 75, and as a result, each circuit (to be described later) is surrounded by the rib 62 and covered with a part of the flat plate portion 61. The rib 62 functions as a partition wall in each circuit, and each circuit is shielded by the rib 62 and a part of the flat plate portion 61.

As shown in FIG. 2, various electronic components and circuits (not illustrated) including a signal processing unit that processes a signal transmitted and received via the main antenna unit 90 are disposed on the circuit board 70. The various electronic components form a plurality of circuit blocks by way of predetermined combinations. For example, various circuit blocks including an RF (Radio Frequency) circuit, a power supply circuit and the like are formed.

In addition to the aforementioned various electronic components, the reference potential patterned layer 75 that configures a reference potential portion is formed on a first face 70a on the case body 60 side of the circuit board 70. The reference potential patterned layer 75 is formed so as to partition each circuit block described above. The reference potential patterned layer 75 is formed by printing an electrically conductive member in a predetermined pattern on the surface of the first face 70a of the circuit board 70.

The main antenna unit 90 is configured by disposing an antenna element of a predetermined shape on a base. The main antenna unit 90 is disposed on the end portion side that is opposite to the connecting portion 4 side in the cellular telephone device 1. The antenna element of the main antenna unit 90 is formed of a belt-shaped sheet metal. Moreover, the main antenna unit 90 is fed with power from the circuit board 70 via a feed terminal (not illustrated). As a result, the antenna element is fed with power from the circuit board 70 via the feed terminal, and is connected to the RF modules and the like on the circuit board 70.

As shown in FIG. 2, a removable battery lid 2c is provided on one end side of the rear case 2b (in FIG. 2). The battery lid 2c is mounted to the rear case 2b after accommodating the battery 80 from the outside of the rear case 2b. Furthermore, the microphone 12 (not illustrated) for inputting sound of the user is accommodated in one end side of the rear case 2b.

As shown in FIG. 3, the display unit side body 3 includes: the front panel 3a; the front case 3b; the speaker 22; the display unit 21; a printed circuit board 85 to which the display unit 21 is connected; the rear case 3c; the rear panel 3d, the loop antenna 100; an RFID chip 110, and a magnetic sheet 160.

The front panel 3a, the loop antenna 100 as well as the RFID chip 110, the front case 3b, the display unit 21, the printed circuit board 85, the magnetic sheet 160, the rear case 3c and the rear panel 3d are disposed so as to be superimposed in the display unit side body 3. The front case 3b and the rear case 3c are disposed such that concave inner surfaces thereof face each other, and are connected such that peripheries thereof are superimposed with each other.

The loop antenna 100 and the RFID chip 110 are disposed between the front panel 3a and the front case 3b.

Moreover, the printed circuit board 85, to which the display 21 is connected, is built in and interposed between the front case 3b and the rear case 3c. A speaker, to which an amplifier (not illustrated) is connected, is connected to the printed circuit board 85.

In addition, the magnetic sheet 160 is disposed between the printed circuit board 85 and the rear case 3c.

As shown in FIG. 3, the RFID chip 110 is connected to the loop antenna 100. An external reading/writing device reads and writes information from and into the RFID chip 110 via the loop antenna 100.

As shown in FIG. 3, the loop antenna 100 is disposed on an end portion side that is opposite to the connecting portion 4 side in the display unit side body 3. The loop antenna 100 is disposed so as to be closer to the display unit side inner face 3A side in the display unit side body 3. As described later, the loop antenna 100 is disposed adjacently to or separately from the magnetic field shielding portion 170, depending on the state of the cellular telephone device 1.

The loop antenna 100 includes a sheet portion 102 and a coil portion 104 disposed on the sheet portion 102.

The sheet portion 102 is a sheet-like member consisting of a PET (polyethylene terephthalate) material, and is a flexibly deformable member.

The coil portion 104 is formed by coiling a film-like conductive member.

The loop antenna 100 communicates with a reading/writing device (not illustrated) at a predetermined usable frequency band (for example, 13.56 Hz).

As shown in FIG. 3, the magnetic sheet 160 is disposed on an end side that is opposite to the connecting portion 4 in the display unit side body 3. The magnetic sheet 160 is disposed so as to be closer to the display unit side outer face 3B side in the operation unit side body 2. The magnetic sheet 160 is disposed so as to be superimposed with the loop antenna 100 in a thickness direction of the display unit side body 3. As described later, the loop antenna 100 is disposed adjacently to or separately from the magnetic field shielding portion 170, depending on the state of the cellular telephone device 1.

Here, a description is provided for a positional relationship between the loop antenna 100 and the magnetic field shielding portion 170 in each state of the cellular telephone device 1 with reference to FIGS. 4 to 7.

As shown in FIG. 4, in a case in which the cellular telephone device 1 is in the first closed state, the operation unit side inner face 2A is adjacently disposed to face the display unit side inner face 3A, in which the magnetic field shielding portion 170 is disposed on the operation unit side inner face 2A, and the loop antenna 100 is disposed so as to be closer to the display unit side inner face 3A. In a case in which the cellular telephone device 1 is in the first closed state, the loop antenna 100 is disposed so as to be superimposed with the magnetic field shielding portion 170 in the direction in which the operation unit side body 2 and the display unit side body 3 are superimposed, and is also disposed in an adjacent position that is adjacent to the magnetic field shielding portion 170 in the direction of being superimposed. In other words, in a case in which the cellular telephone device 1 is in the first closed state, the loop antenna 100 is in a state of not being capable of communicating with a reading/writing device disposed outside.

As shown in FIG. 5, in a case in which the cellular telephone device 1 is in the first opened state, an end portion of the operation unit side body 2 in which the magnetic field shielding portion 170 is disposed, the end portion being opposite to the connecting portion 4 side, and an end portion of the display unit side body 3 in which the loop antenna 100 is disposed, the end portion being opposite to the connecting portion 4 side, are disposed so as to be separated from each other. In a case in which the cellular telephone device 1 is in the first opened state, the loop antenna 100 is not superimposed with the magnetic field shielding portion 170 in the thickness direction, and is disposed so as to be separated from the magnetic field shielding portion 170. In other words, in a case in which the cellular telephone device 1 is in the first opened state, the loop antenna 100 is in a state of being capable of communicating with a reading/writing device disposed outside.

As shown in FIG. 6, in a case in which the cellular telephone device 1 is in the second opened state, an end portion of the operation unit side body 2 in which the magnetic field shielding portion 170 is disposed, the end portion being opposite to the connecting portion 4 side, and an end portion of the display unit side body 3 in which the loop antenna 100 is disposed, the end portion being opposite to the connecting portion 4 side, are disposed so as to be separated from each other. In a case in which the cellular telephone device 1 is in the second opened state, the loop antenna 100 is not superimposed with the magnetic field shielding portion 170 in the thickness direction, and is disposed so as to be separated from the magnetic field shielding portion 170. In other words, in a case in which the cellular telephone device 1 is in the second opened state, the loop antenna 100 is in a state of being capable of communicating with a reading/writing device disposed outside.

As shown in FIG. 7, in a case in which the cellular telephone device 1 is in the second closed state, the operation unit side inner face 2A, on which the magnetic field shielding portion 170 is disposed, and the display unit side inner face 3A, to which the loop antenna 100 is disposed so as to be closer, are disposed so as to be separated in the direction of being superimposed. In a case in which the cellular telephone device 1 is in the second closed state, the loop antenna 100 is disposed so as to be superimposed with the magnetic field shielding portion 170 in the direction in which the operation unit side body 2 and the display unit side body 3 are superimposed, and is also disposed in a separated position that is more separated from the magnetic field shielding portion 170 in the direction of being superimposed than the adjacent position.

In a case in which the cellular telephone device 1 is in the second closed state, the loop antenna 100 is disposed on an outer face of the body (the cellular telephone device 1) that is in the second closed state. Here, the display unit side outer face 3B, to which the magnetic sheet 160 is disposed closer, is disposed so as to face the operation unit side inner face 2A. The magnetic sheet 160 is disposed between the loop antenna 100 and the magnetic field shielding portion 170 in the direction of being superimposed.

In a case in which the cellular telephone device 1 is in the second closed state, the loop antenna 100 is disposed so as to be more separated from the magnetic field shielding portion 170 than the first closed state, and is disposed so as to face the magnetic field shielding portion 170 with the magnetic sheet 160 interposed therebetween. In this way, the loop antenna 100 is disposed so as to face the magnetic field shielding portion 170 with the magnetic sheet 160 interposed therebetween and to be separated at a predetermined distance; therefore, the loop antenna 100 is in a state of being capable of communicating with the outside. In other words, in a case in which the cellular telephone device 1 is in the second closed state, the loop antenna 100 is in a state of being capable of communicating with a reading/writing device disposed outside.

Subsequently, a circuit configuration of the cellular telephone device 1 is described with reference to FIG. 8.

Figure 8:
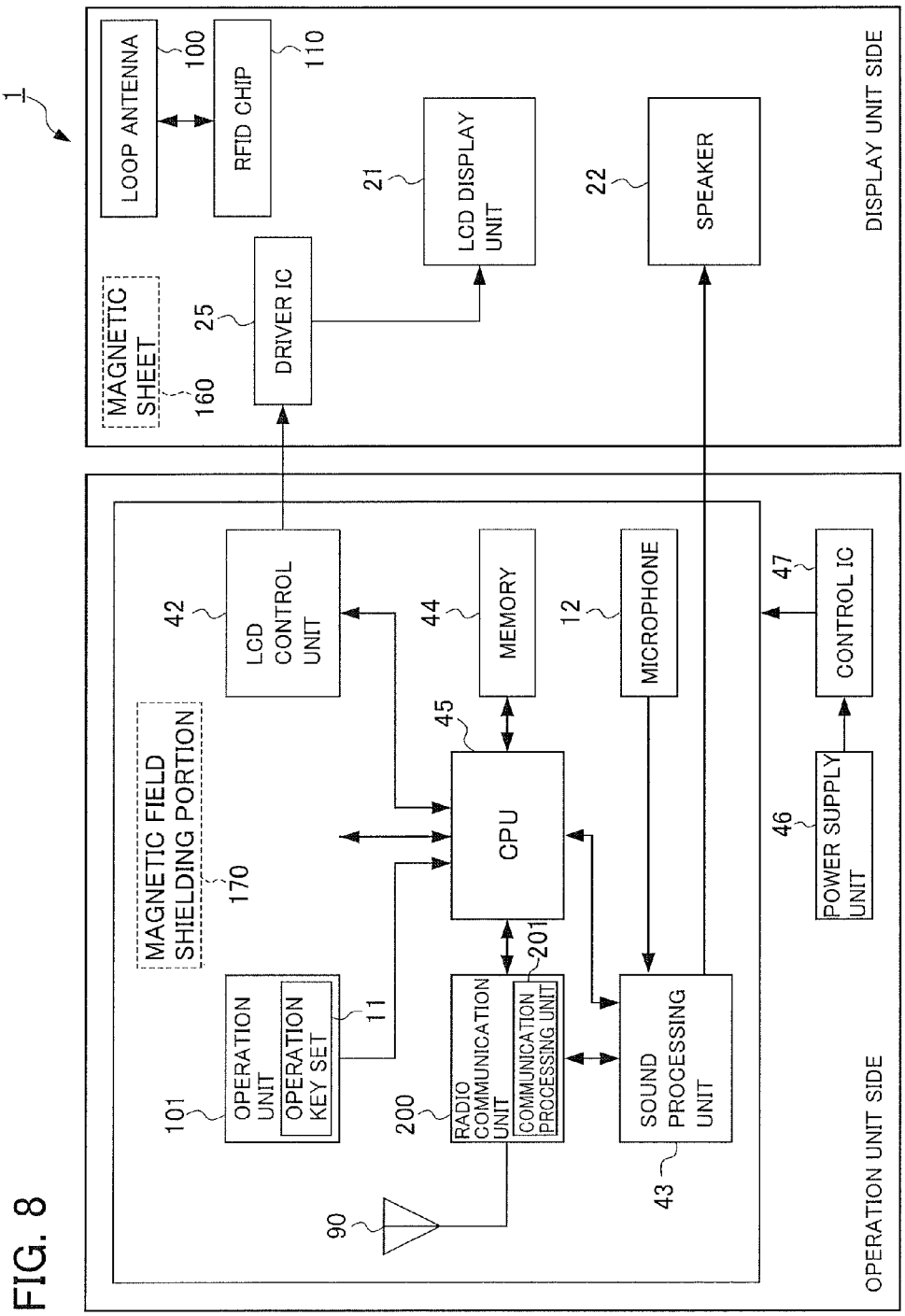
FIG. 8 is a block diagram illustrating a circuit configuration of the cellular telephone device 1.

FIG. 8 is a block diagram illustrating the circuit configuration of the cellular telephone device 1.

As shown in FIG. 7, the cellular telephone device 1 includes: a radio communication unit 200 disposed in the operation unit side body 2; an operation unit 101 as an input unit; the microphone 12; an LCD control unit 42; a sound processing unit 43; memory 44 as a storage unit; a CPU 45; a power supply unit 46; a control IC 47; the display unit 21 disposed in the display unit side body 3; the speaker 22; a driver IC 25; the loop antenna 100; and the RFID chip 110.

The radio communication unit 200 includes: the main antenna unit 90 that communicates with external devices at a predetermined usable frequency band; and a communication processing unit 201 that performs signal processing such as modulation processing or demodulation processing.

The main antenna unit 90 communicates with base stations (not illustrated) at a predetermined usable frequency band (for example, 800 MHz). The main antenna unit 90 communicates with external communication devices via the base stations at the predetermined usable frequency band. It should be noted that, although the predetermined usable frequency band is set to 800 MHz in the present embodiment, other frequency bands can also be used. Moreover, the main antenna unit 90 may be configured as a so-called dual band compatible antenna that can accept a second usable frequency band (for example, 2 GHz) in addition to the predetermined usable frequency band (a first usable frequency band), or as a multi-band compatible antenna that can further accept a third usable frequency band.

The communication processing unit 201 performs modulation processing on a signal transmitted from a predetermined function unit, and transmits the signal to base stations via the main antenna unit 90, and in addition, performs demodulation processing on a signal received via the main antenna unit 90, and transmits the signal to a predetermined function unit.

The operation unit 101 is configured by including the operation key set 11.

The LCD control unit 42 performs predetermined image processing on input image data in accordance with control by the CPU 45, and outputs the image data, on which the image processing has been performed, to the driver IC 25. The driver IC 25 stores the image data being input from the LCD control unit 42 in frame memory, and outputs the image data stored in the frame memory to the display unit 21 at predetermined timing.

The display unit 21 displays predetermined characters and images based on the data that is input from the driver IC 25.

The memory 44 stores predetermined data. More specifically, the memory 44 stores application programs that operate various functions, profile information, address information that is utilized for an address book function, and the like.

The CPU 45 controls the entirety of the cellular telephone device 1. The CPU 45 performs predetermined control of, in particular, the radio communication unit 200, the LCD control unit 42 and the sound processing unit 43.

In accordance with control by the CPU 45, the sound processing unit 43 performs predetermined sound processing on a signal transmitted from the communication processing unit 201, and outputs the signal on which the sound processing has been performed to the speaker 22. The speaker 22 outputs sound to the outside, based on a signal that is transmitted from the sound processing unit 43. Moreover, in accordance with control by the CPU 45, the sound processing unit 43 performs predetermined processing on a signal that is input from the microphone 12, and outputs the signal thus processed to the communication processing unit 201. The communication processing unit 201 performs predetermined processing on the signal that is input from the sound processing unit 43, and outputs the signal thus processed to the main antenna unit 90.

The power supply unit 46 is configured by including the battery 80. The battery 80 is a lithium-ion battery having predetermined capacity. The control IC 47 converts a power supply voltage, which is supplied from the power supply unit 46, into a predetermined power voltage, and supplies the power supply voltage thus converted to each unit (for example, the CPU 45 and the like) of the cellular telephone device 1.

The loop antenna 100, when approaching within a predetermined distance to a reading/writing device disposed outside, receives a magnetic field transmitted from the reading/writing device (modulated with respect to a carrier frequency (for example, 13.56 MHz)).

The RFID chip 110 includes: a power circuit that generates a predetermined voltage based on electrical power induced by a signal received via the loop antenna 100; an RF circuit that performs signal processing such as modulation processing or demodulation processing on a signal communicated via the loop antenna 100; a CPU that performs predetermined arithmetic processing; and memory that stores predetermined data.

The power circuit is configured with, for example, a DC-DC converter.

The power circuit generates a predetermined power supply voltage from an electromotive force that is produced by an electromagnetic induction effect of the loop antenna 100 having received a magnetic field, and supplies the power supply voltage to the RF circuit, the CPU and the memory. The RF circuit, the CPU and the memory transition from a halt state to an active state as a result of the predetermined power supply voltage being supplied from the power circuit.

The RF circuit performs signal processing such as demodulation on a signal received via the loop antenna 100, and transmits the signal thus processed to the CPU.

The RF circuit performs signal processing such as modulation on data that has been read from the memory, and transmits the data to an external reading/writing device via the loop antenna 100.

Based on such a signal transmitted from the RF circuit, the CPU writes or reads data to or from the memory. In a case of reading data from the memory, the CPU transmits the data to the RF circuit.

Here, in a case in which the cellular telephone device 1 is in the opened state (the first opened state, the second opened state) (see FIGS. 5 and 6), the loop antenna 100 is disposed so as to be separated from the magnetic field shielding portion 170, and thus the loop antenna 100 is in a state of being capable of communicating with a reading/writing device disposed outside. In other words, in the opened state (the first opened state, the second opened state), the cellular telephone device 1 is in a state of being capable of writing and reading data to and from the RFID chip 110.

Here, in a case in which the cellular telephone device 1 is in the first closed state (see FIG. 4), the loop antenna 100 is disposed in the adjacent position that is adjacent to the magnetic field shielding portion 170, and thus the loop antenna 100 is in a state of not being capable of communicating with a reading/writing device disposed outside. In other words, in the first closed state, the cellular telephone device 1 is in a state of not being capable of writing and reading data to and from the RFID chip 110.

Moreover, in a case in which the cellular telephone device 1 is in the second closed state (see FIG. 7), the loop antenna 100 is disposed in the separated position that is separated from the magnetic field shielding portion 170, and thus the loop antenna 100 is in a state of being capable of communicating with a reading/writing device disposed outside. Particularly, in the present embodiment, the loop antenna 100 is disposed so as to face the magnetic field shielding portion 170 with the magnetic sheet 160 interposed therebetween; therefore, the loop antenna 100 is preferably capable of communicating with a reading/writing device disposed outside, as compared to a case in which the loop antenna 100 faces the magnetic field shielding portion 170 without the magnetic sheet 160 interposed therebetween. In other words, in the second closed state, the cellular telephone device 1 is in a state of being capable of writing and reading data to and from the RFID chip 110.

The cellular telephone device 1 in the present embodiment can be switched between the state of being capable of communicating via the loop antenna 100 and the state of not being capable of communicating via the loop antenna 100, by changing its form (the opened state/closed state). In the present embodiment, in the closed state where the communication function or the like is not utilized while the user is carrying the cellular telephone device 1, the cellular telephone device 1 is in the state of not being capable of communicating via the loop antenna 100.

In addition, according to the present embodiment, it is possible to switch between the state of being capable of communicating via the loop antenna 100 and the state of not being capable of communicating via the loop antenna 100, only by changing the state of the cellular telephone device 1. As a result, the user can switch the cellular telephone device 1 between the state of being capable of communicating via the loop antenna 100 and the state of not being capable of communicating via the loop antenna 100, by way of a simple operation. Furthermore, the state of being capable of communicating via the loop antenna 100 and the state of not being capable of communicating via the loop antenna 100 can be switched by way of a simple operation, a result of which suppresses failure to switch to the state of not being capable of communication for a conventional reason that a switching operation is complicated. As a result, unintentional writing and reading information to and from the RFID tip 110, which are not intended by the user, are suppressed. For example, this can suppress stealth withdrawal of electronic money charged therein.

Moreover, according to the present embodiment, the cellular telephone device 1 is not capable of communicating via the loop antenna 100 in the closed state that is an ordinary carrying state; therefore, unintentional reading and writing of information as described above can be preferably suppressed. In other words, the cellular telephone device 1 with improved security is provided.

Although the preferable embodiment has been described above, the present invention is not limited to the aforementioned embodiment, and can be implemented as various embodiments. For example, the cellular telephone device 1 is described as a portable electronic device in the present embodiment; however, the present invention is not limited thereto, and the portable electronic device may be a PHS (Personal Handyphone System), a PDA (Personal Digital Assistant), a portable navigation device, a notebook PC, or the like.

In addition, in the present embodiment, the loop antenna 100 includes the sheet portion 102 and the coil portion 104 disposed on the sheet portion 102 and formed by coiling a film-like conductive member; however, the loop antenna 100 is not limited thereto, and may be configured by including a coil portion on which a lead wire is wound.

Furthermore, in the present embodiment, the loop antenna 100 (the RFID chip 110) has been described as a passive induction field type (electromagnetic induction type) without a power supply unit; however, the loop antenna 100 is not limited thereto. The loop antenna 100 (the RFID chip 110) may be of, for example, a passive mutual induction type (electromagnetic coupling type) or a radiation electromagnetic field type (radio wave type). Moreover, the loop antenna 100 (the RFID chip 110) may be of, for example, an active type having a power supply unit.

In addition, an external device may be of a read/write type, a read-only type, a write-once type, etc.

Furthermore, although the loop antenna 100 is disposed in the display unit side body 3 in the present embodiment, it is not limited thereto, and the loop antenna 100 may be disposed in the operation unit side body 2. In this case, the magnetic field shielding portion 170 is disposed in the display unit side body 3.

Furthermore, although the cellular telephone device 1 of a so-called 2-axis hinge type is described in the present embodiment, it is not limited thereto. The cellular telephone device 1 may be configured so as to be transformable into: the first state in which the display unit side body 3 is disposed in the first relative position with regard to the operation unit side body 2; and the second state in which the display unit side body 3 is disposed in the second relative position different from the first relative position with regard to the operation unit side body 2; and the cellular telephone device 1 may be of, for example: a slider type in which one body slides in one direction from a state in which the operation unit side body 2 and the display unit side body 3 are mutually superimposed; and a cycloid (rotation) type that is rotatable around a rotational axis line extending in the thickness direction of the display unit side body 3.

A description is hereinafter provided for embodiments of a slider type and a cycloid type.

Figure 9:
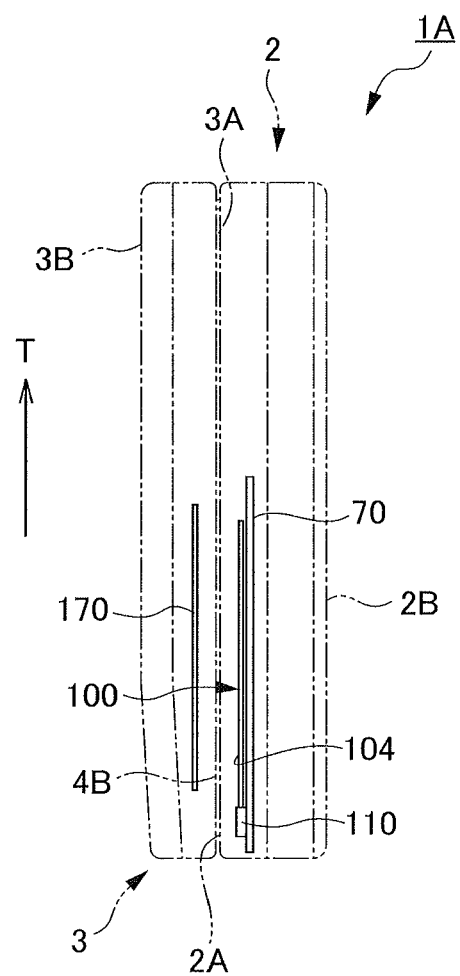
FIG. 9 is a diagram illustrating an arrangement and a state of the loop antenna 100 in a closed state.
Figure 10:
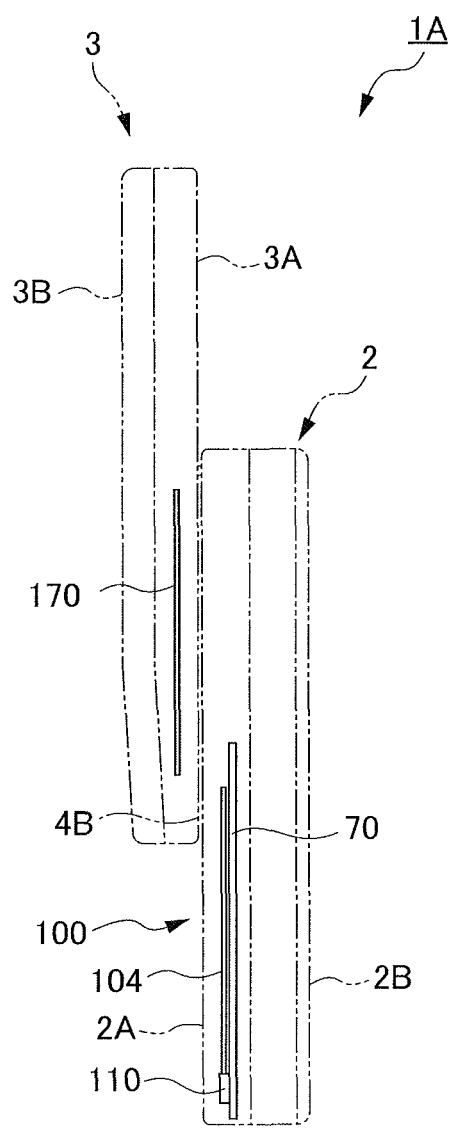
FIG. 10 is a diagram illustrating an arrangement and a state of the loop antenna 100 in an opened state.

First, a description is provided for an embodiment in which the cellular telephone device is of a slider type, with reference to FIGS. 9 and 10.

FIG. 9 is a diagram illustrating an arrangement and a state of the loop antenna 100 in the closed state. FIG. 10 is a diagram illustrating an arrangement and a state of the loop antenna 100 in the opened state.

In the following, descriptions of configurations similar to those of the aforementioned cellular telephone device 1 (the opening-and-closing type) are omitted, and different configurations are mainly described.

As shown in FIGS. 9 and 10, a cellular telephone device 1A includes the operation unit side body 2 and the display unit side body 3 that is disposed so as to be superimposed on the operation unit side inner face 2A side of the operation unit side body 2. The display unit side body 3 is connected with the operation unit side body 2 so as to be slidably moved over the operation unit side inner face 2A.

The cellular telephone device 1A includes a connecting portion 4B that connects the operation unit side body 2 and the display unit side body 3, such that the operation unit side body 2 and the display unit side body 3 can slidably move in positions relative to each other. The connecting portion 4B connects the operation unit side body 2 and the display unit side body 3 such that the cellular telephone device 1A is transformable into an opened state and a closed state.

More specifically, the connecting portion 4B connects the operation unit side body 2 and the display unit side body 3 so as to be slidably moved, such that the cellular telephone device 1A is transformable into: the opened state (see FIG. 10) in which the display unit side body 3 is disposed in an opened position as a first relative position with regard to the operation unit side body 2, and a predetermined area of the operation unit side inner face 2A is exposed to the outside; and the closed state (see FIG. 9) in which the display unit side body 3 is disposed in a closed position as a relative second position with regard to the operation unit side body 2, so as to cover the predetermined area of the operation unit side inner face 2A.

As shown in FIGS. 9 and 10, the loop antenna 100 is disposed in the operation unit side body 2. The loop antenna 100 includes the sheet portion 102 and the coil portion 104 disposed on the sheet portion 102.

As shown in FIGS. 9 and 10, the magnetic field shielding portion 170 is disposed in the display unit side body 3.

As shown in FIG. 9, in a case in which the cellular telephone device 1A is in the closed state, the loop antenna 100 is adjacently disposed so as to be superimposed with the magnetic field shielding portion 170 in the direction in which the operation unit side body 2 and the display unit side body 3 are superimposed. In this case, the loop antenna 100 is in a state of not being capable of communicating. In other words, in the closed state, the cellular telephone device 1 is in a state of not being capable of writing and reading data to and from the RFID chip 110.

When the closed state in FIG. 9 transitions to the opened state by slidably moving the display unit side body 3 in a direction of an arrow T, the loop antenna 100 is disposed in the separated position that is separated from the magnetic field shielding portion 170. In a case in which the cellular telephone device 1A is in the opened state, the loop antenna 100 is disposed in a position that is not superimposed with the magnetic field shielding portion 170 in the direction in which the operation unit side body 2 and the display unit side body 3 are superimposed. In a case in which the cellular telephone device 1A is in the opened state, the loop antenna 100 is disposed in a separated position that is more separated from the magnetic field shielding portion 170 than the adjacent position. In this case, the loop antenna 100 is in a state of being capable of communicating. In other words, in the opened state, the cellular telephone device 1 is in a state of being capable of writing and reading data to and from the RFID chip 110.

According to the present embodiment, an effect similar to the effect in the aforementioned cellular telephone device 1 can be achieved.

Moreover, in the present embodiment, the loop antenna 100 is disposed in the adjacent position that is adjacent to the magnetic field shielding portion 170 in a case in which the cellular telephone device 1A is in the closed state, and the loop antenna 100 is disposed in the separated position that is more separated from the magnetic field shielding portion 170 than the adjacent position in a case in which the cellular telephone device 1A is in the opened state; however, it is not limited thereto. The loop antenna 100 may be disposed in the adjacent position that is adjacent to the magnetic field shielding portion 170 in a case in which the cellular telephone device 1A is in the opened state, and the loop antenna 100 may be disposed in the separated position that is more separated from the magnetic field shielding portion 170 than the adjacent position in a case in which the cellular telephone device 1A is in the closed state.

Moreover, the structure and configuration of the loop antenna 100, and other forms of type of an external device are similar to those in the cellular telephone device 1.

Figure 11:
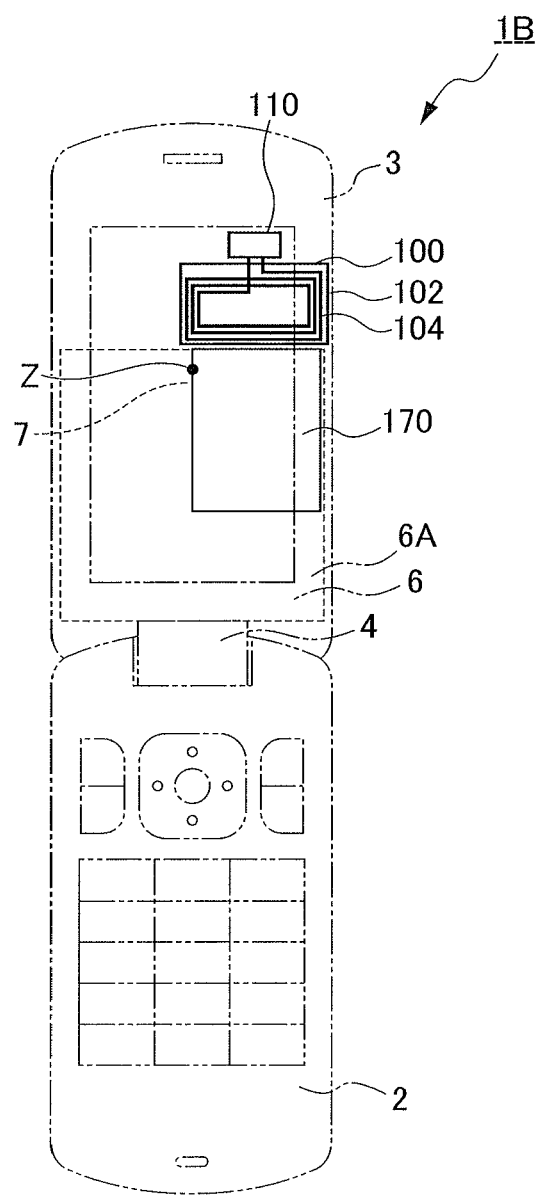
FIG. 11 is a diagram illustrating an arrangement and a state of the loop antenna 100 in a first state.
Figure 12:
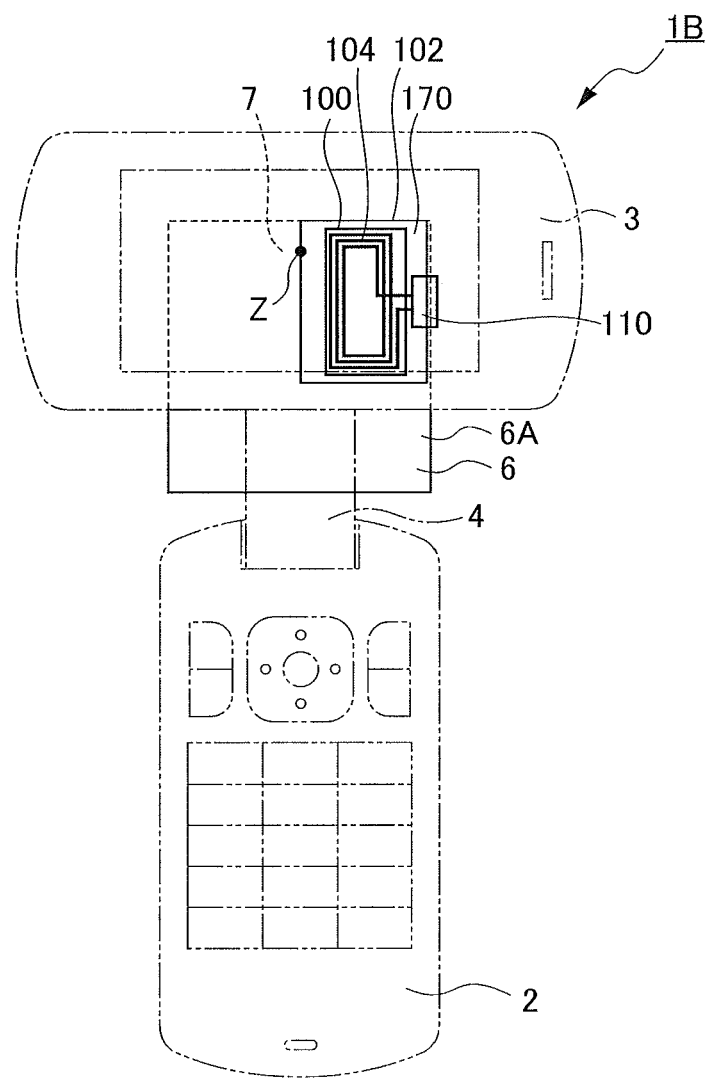
FIG. 12 is a diagram illustrating an arrangement and a state of the loop antenna 100 in a second state.

Next, a description is provided for an embodiment in which the cellular telephone device is of a cycloid type, with reference to FIGS. 11 and 12.

FIG. 11 is a diagram illustrating an arrangement and a state of the loop antenna 100 in a first state. FIG. 12 is a diagram illustrating an arrangement and a state of the loop antenna 100 in a second state.

A cellular telephone device 1B includes: the operation unit side body 2; a support member 6 as a first body having an inner face 6A as a first face; the display unit side body 3 as a second body that is disposed so as to be superimposed on the inner face 6A side of the support member 6; and a connecting portion 7 that connects the display unit side body 3 and the support member 6 so as to be relatively rotatable around a rotational axis Z that perpendicularly intersects the inner face 6A.

The connecting portion 7 includes the rotational axis Z, and connects the display unit side body 3 and the support member 6 so as to be relatively rotatable around the rotational axis Z, such that the cellular telephone device 1B is transformable into: the first state (see FIG. 11) in which the display unit side body 3 is disposed in a first relative position with regard to the support member 6; and the second state (see FIG. 12) in which the display unit side body 3 is disposed in a second relative position, which is different from the first relative position, with regard to the support member 6.

As shown in FIGS. 11 and 12, the loop antenna 100 is disposed in the display unit side body 3. The loop antenna 100 includes the sheet portion 102 and the coil portion 104 disposed on the sheet portion 102.

As shown in FIGS. 11 and 12, the magnetic field shielding portion 170 is disposed in the support member 6.

In a case in which the cellular telephone device 1B is in the first state, the loop antenna 100 is disposed in a position that is not superimposed with the magnetic field shielding portion 170 in the direction in which the operation unit side body 2 and the display unit side body 3 are superimposed. In a case in which the cellular telephone device 1B is in the first state, the loop antenna 100 is disposed in a separated position (to be described later) that is more separated from the magnetic field shielding portion 170 than the adjacent position. In this case, the loop antenna 100 is in a state of being capable of communicating. In other words, in the first state, the cellular telephone device 1 B is in a state of being capable of writing and reading data to and from the RFID chip 110.

When the first state in FIG. 11 transitions to the second state by rotatably moving the display unit side body 3 around the rotational axis Z in a direction of an arrow, the loop antenna 100 is disposed in a adjacent position that is adjacent to the magnetic field shielding portion 170, as shown in FIG. 12.

As shown in FIG. 12, in a case in which the cellular telephone device 1B is in the second state, the loop antenna 100 is adjacently disposed so as to be superimposed with the magnetic field shielding portion 170 in the direction in which the operation unit side body 2 and the display unit side body 3 are superimposed. In this case, the loop antenna 100 is in a state of not being capable of communicating. In other words, in the second state, the cellular telephone device 1 is in a state of not being capable of writing and reading data to and from the RFID chip 110.

According to the present embodiment, an effect similar to the effect in the aforementioned cellular telephone device 1 can be achieved.

Moreover, in the present embodiment, the loop antenna 100 is disposed in the separated position that is separated from the magnetic field shielding portion 170 in a case in which the cellular telephone device 1B is in the first state, and the loop antenna 100 is disposed in the adjacent position that is adjacent to the magnetic field shielding portion 170 in a case in which the cellular telephone device 1B is in the second state; however, it is not limited thereto. The loop antenna 100 may be disposed in the adjacent position that is adjacent to the magnetic field shielding portion 170 in a case in which the cellular telephone device 1B is in the second state, and the loop antenna 100 may be disposed in the separated position that is more separated from the magnetic field shielding portion 170 than the adjacent position in a case in which the cellular telephone device 1B is in the first state.

Moreover, the structure and configuration of the loop antenna 100, and other forms of type of an external device are similar to those in the cellular telephone device 1.

The invention claimed is:

1. A portable electronic device, comprising;
a first body;
a second body;
a connecting portion that connects the first body and the second body so as to be transformable into a first state and a second state;
a magnetic field shielding portion that is disposed in the first body;
an antenna that is disposed in the second body, disposed in an adjacent position that is adjacent to the magnetic field shielding portion in the first state, and is disposed in a separated position that is more separated from the magnetic field shielding portion than the adjacent position in the second state; and a magnetic sheet disposed in the second body, wherein
at least the magnetic field shielding portion is not disposed in an area overlapping with the antenna in the second body,
in the second state, the magnetic sheet is disposed between the antenna and the magnetic field shielding portion disposed in the first body,
in the first state, communication by way of the antenna is impossible, and
in the second state, communication by way of the antenna is possible.

2. The portable electronic device according to claim 1, wherein communication with an external device via the antenna is performed when the antenna forms a loop, and
wherein communication with an external device via the antenna is disabled when the antenna does not form a loop.

3. A portable electronic device, comprising;
a first body including a first face;
a second body including a second face and a third face;
a connecting portion that connects the first body and the second body so as to be transformable into a first closed state in which the first face and the second face are disposed to be superimposed in a state of being adjacent to each other, and a second closed state in which the first face and the third face are disposed to be superimposed in a state of being adjacent to each other;
a magnetic field shielding portion that is disposed in the first body;
an antenna that is disposed so as to be closer to a side of the first face of the second body; and
a magnetic sheet disposed in the second body, wherein
at least the magnetic field shielding portion is not disposed in an area overlapping with the antenna in the second body,
in the second closed state, the magnetic sheet is disposed between the antenna and the magnetic field shielding portion disposed in the first body,
in the first closed state, communication by way of the antenna is impossible, and
in the second closed state, communication by way of the antenna is possible.

4. The portable electronic device according to claim 3, wherein the antenna is disposed in an adjacent position that is adjacent to the magnetic field shielding portion in the first closed state, and
wherein the antenna is disposed in a separated position that is more separated from the magnetic field shielding portion than the adjacent position in the second closed state.

5. The portable electronic device according to claim 3, wherein the magnetic sheet is disposed closer to a side of the third face of the second body.

6. The portable electronic device according to claim 5, wherein the magnetic sheet is disposed between the magnetic field shielding portion and the antenna in the second closed state.

7. A portable electronic device, comprising;
a first body including a first face;
a second body that is disposed so as to be superimposed on a side of the first face of the first body;
a connecting portion that connects the first body and the second body so as to be relatively and slidably moved and to be transformable into an opened state in which a predetermined area of the first face is externally exposed, and a closed state in which the predetermined area is covered;
a magnetic field shielding portion that is disposed in the first body;
an antenna that is disposed in the second body, disposed in an adjacent position that is adjacent to the magnetic field shielding portion in one of the opened state or the closed state, and is disposed in a separated position that is more separated from the magnetic field shielding portion than the adjacent position in another one of the opened state or the closed state; and
a magnetic sheet disposed in the second body, wherein
at least the magnetic field shielding portion is not disposed in an area overlapping with the antenna in the second body,
in the another one of the opened state or the closed state, the magnetic sheet is disposed between the antenna and the magnetic field shielding portion disposed in the first body,
in the closed state, communication by way of the antenna is impossible, and
in the opened state, communication by way of the antenna is possible.

8. The portable electronic device according to claim 7, wherein the antenna in a state of being disposed in the adjacent position is adjacently disposed so as to be superimposed with the magnetic field shielding portion.

* * * * *